(12) United States Patent
Williams et al.

(10) Patent No.: US 7,886,337 B2
(45) Date of Patent: Feb. 8, 2011

(54) METHOD AND APPARATUS FOR CONTENT PROTECTION

(75) Inventors: Ian M. Williams, Menlo Park, CA (US); Michael B. Diamond, Los Gatos, CA (US)

(73) Assignee: NVIDIA Corporation, Santa Clara, CA (US)

( * ) Notice: Subject to any disclaimer, the term of this patent is extended or adjusted under 35 U.S.C. 154(b) by 1125 days.

(21) Appl. No.: 10/690,860

(22) Filed: Oct. 22, 2003

(65) Prior Publication Data

US 2005/0091498 A1 Apr. 28, 2005

(51) Int. Cl.
*H04L 9/00* (2006.01)

(52) U.S. Cl. .............................. 726/2; 348/461; 348/467

(58) Field of Classification Search ................. 726/1–6, 726/17, 21, 22–27, 30, 32; 380/168, 54; 705/57–59, 19; 382/115–118, 173–178, 382/254, 260; 713/168, 176, 186; 709/223–225; 345/619–626, 618, 418, 501, 538, 212, 3.2, 345/601, 602; 348/207.99, 207, 211.99, 348/143, 461, 467; 725/32, 40, 93
See application file for complete search history.

(56) References Cited

U.S. PATENT DOCUMENTS

| | | | | |
|---|---|---|---|---|
| 5,845,303 A | * | 12/1998 | Templeman | 715/255 |
| 5,963,961 A | * | 10/1999 | Cannon et al. | 707/202 |
| 6,374,036 B1 | * | 4/2002 | Ryan et al. | 386/94 |
| 6,388,638 B2 | * | 5/2002 | Fukushima et al. | 345/7 |
| 6,697,784 B2 | * | 2/2004 | Bacon et al. | 705/9 |
| 6,778,760 B1 | * | 8/2004 | Kagle | 386/96 |
| 6,971,119 B1 | * | 11/2005 | Arsenault et al. | 725/89 |
| 7,010,046 B2 | * | 3/2006 | Trevers et al. | 375/240.29 |
| 7,072,300 B1 | * | 7/2006 | Chow et al. | 370/236 |
| 7,218,754 B2 | * | 5/2007 | Schumann et al. | 382/100 |
| 7,321,719 B2 | * | 1/2008 | Kagle | 386/96 |
| 7,329,188 B2 | * | 2/2008 | Brown | 463/42 |
| 7,348,955 B2 | * | 3/2008 | Satoh et al. | 345/98 |
| 2007/0005795 A1 | * | 1/2007 | Gonzalez | 709/232 |

OTHER PUBLICATIONS

"Content Protection Technologies," European Industry Association. <http://www.eicta.org/levies/docs/Content%20Protection%20Techs.pdf>, Nov. 26, 2003.

* cited by examiner

*Primary Examiner*—Kimyen Vu
*Assistant Examiner*—Leynna T Truvan
(74) *Attorney, Agent, or Firm*—Patterson & Sheridan, LLP.

(57) ABSTRACT

Method and apparatus for protecting image content. In an embodiment, tags are used to identify how to alter image content. A graphics processor is configured to process the tags and to alter the image responsive to the tags. In another embodiment, a graphics processor is configured to alter image content unless a key is provided to the graphics processor.

31 Claims, 16 Drawing Sheets

METHOD AND APPARATUS FOR CONTENT PROTECTION

FIELD OF THE INVENTION

One or more aspects of the invention relate generally to protection of content, and more particularly to a content protection environment.

BACKGROUND OF THE INVENTION

Content protection may be cryptographically based or signal-processing based or a combination thereof. Generally, cryptographically-based content protection is applied to the digital domain, while signal-processing based content protection is applied to the analog domain.

There are many examples of cryptographically-based content protection in use today. Digital video discs ("DVDs") use a Content Scrambling System ("CSS") that requires a 40-bit long key to decipher the encrypted content. Content Protection for Recordable Media ("CPRM") is a broadcast encryption technology applied to physical media, where a media key block is prerecorded on blank media. Content Protection for Pre-recorded Media, a variant of CPRM, is used to protect DVD Audio formatted discs. CPRM is also used to protect content stored in Secure Digital Memory Cards, Secure CompactFlash, the IBM MicroDrive, and DVD video recorders.

More recent developments include Digital Transmission Content Protection ("DTCP"), a public-key technology applied to a digital bus, such as a Universal Serial Bus ("USB") and an Institute of Electronic and Electrical Engineers ("IEEE") 1394 bus ("Firewire"). High Definition Content Protection ("HDCP") has been proposed to protect content transferred from a Digital Video Interface ("DVI") (a digital video interface to a high-definition monitor/television). HDCP expands on authentication of DTCP to establish a session key used to encrypt video data.

In the software arena, content protection includes cryptographic switching ("cryptoswitch") and digital signets technologies. Cryptoswitch involves only having a small portion of a program in the clear for runtime, and leaving the remainder encrypted. Signets are used to detect unauthorized modification of a program.

The standards bodies of Digital Video Broadcast and TV Anytime have considered proposals for content protection in home networks, such as SmartRight, Open Conditional Content Access Management ("OCCAM") and xCP Cluster Protocol. Other network or system level approaches include Broadcast Flag, Content Protection System Architecture ("CPSA") and Digital-Rights Management ("DRM") systems. In Broadcast Flag, a bit is set to indicate content is not to be distributed over the Internet, and otherwise the content is protected by DTCP and CPRM. CPSA is another architecture describing how, DTCP and CPRM fit together along with watermarking, using interlocking licenses. DRM systems use the Internet to distribute keys for decryption through a clearing house.

In the signal-processing based content protection arena, an out-of-specification television signal, not detectible by a television, but detectable by most video recorders is used. Also, digital watermarking for copy control, whether record control or playback control, is used. Pattern recognition ("fingerprinting") is being considered. However, recognition is a statistical process, which by definition, is inexact. A library of content needing to be interrogated would be significantly large, for example for broadcast monitoring. Accordingly, watermarking is presently more favored for identification purposes.

Because of the many ways that content may be copied, displayed and distributed, no one technology is a complete solution to protecting content within all of these possible contexts. Accordingly, technology that advances the interests of a content protection environment is desirable and useful.

SUMMARY OF THE INVENTION

An aspect of the invention is a method for protecting digital content. The digital content is provided to a graphics processor. A portion of the frames of the digital content is altered at least approximately contemporaneous with recording within the graphics processor responsive to tags in a data stream provided thereto, where alteration of the portion of the frames of the digital content is not visually perceptible for real-time display but is visually perceptible in recorded version thereof.

An aspect of the invention is a device for protecting digital content, comprising a graphics processor configured to detect tags in a data stream and to associate the tags detected with commands for altering image content.

An aspect of the invention is digital video content, comprising: tags for altering frames by a graphics processor.

BRIEF DESCRIPTION OF THE DRAWINGS

Accompanying drawing(s) show exemplary embodiment(s) in accordance with one or more aspects of the invention; however, the accompanying drawing(s) should not be taken to limit the invention to the embodiment(s) shown, but are for explanation and understanding only.

DETAILED DESCRIPTION OF THE DRAWINGS

The description that follows is directed to image cloaking and watermarking for a content protection environment or an enhanced content protection environment. The image cloaking may be embedded in the content itself, the recording device, the driver software, or the hardware, or any combination of one or more of the above. Content is cloaked without disturbing the viewing experience for authorized users. A rendering unit ("RU") is used to process video data to provide image cloaking. Examples of rendering units include graphics processing units (GPU) and video processing units (VPU).

Figure 1:
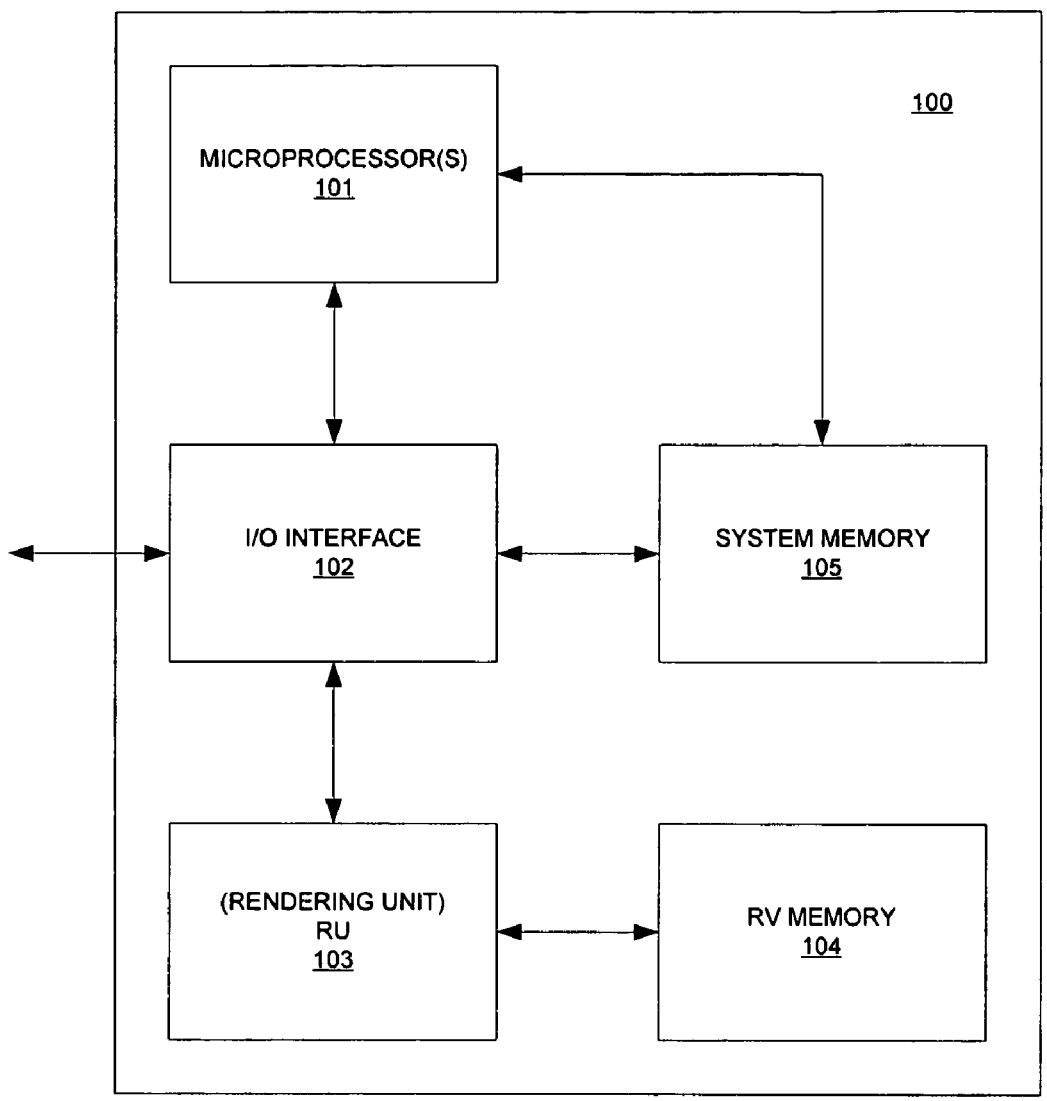
FIG. 1 is a high-level block diagram depicting an exemplary embodiment of a compute.

FIG. 1 is a high-level block diagram depicting an exemplary embodiment of a computer 100. Computer 100 includes at least one microprocessor 101, an input/output ("I/O") interface 102, system memory 105, a RU 103 and optionally RU memory 104. Image information provided to RU 103 is cloaked by RU 103.

Figure 2:
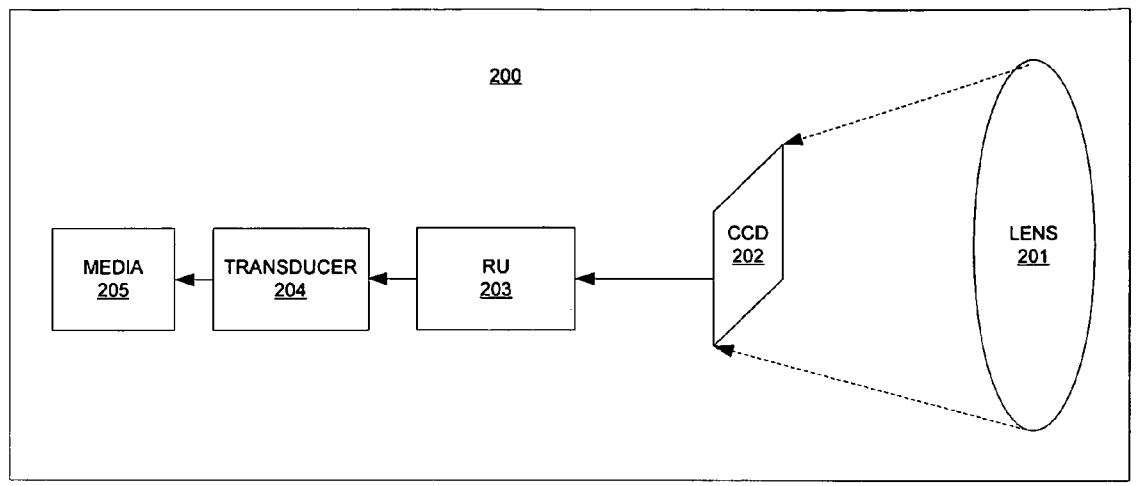
FIG. 2 is a high-level block diagram depicting an exemplary embodiment of a digital image, still or moving, camera.

FIG. 2 is a high-level block diagram depicting an exemplary embodiment of a digital image, still or moving, camera 200. Visual information is obtained via lens 201 which is provided to charge-coupled device ("CCD") 202. The visual information is converted from its analog form to a digital representation thereof by CCD 202. The digital representation is provided to RU 203 for processing. Output of RU 203 is provided to a transducer 204 for writing to media 205 in an embodiment. In another embodiment, transducer 204 is omitted for writing to media 205, where media is a direct storage means, such as flash memory, among other direct digital information storage means.

Figure 3:
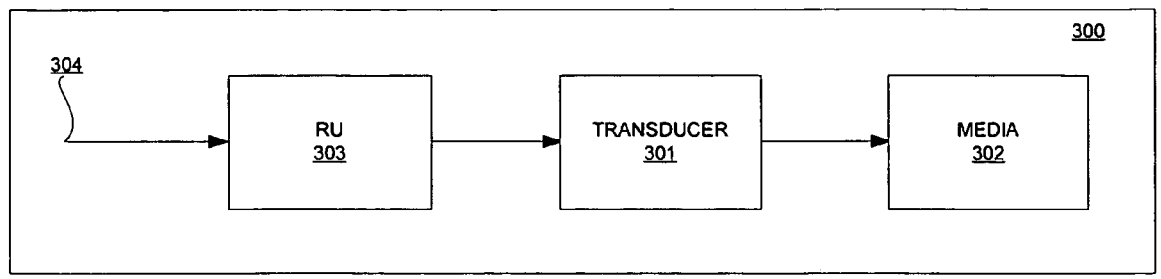
FIG. 3 is a high-level block diagram depicting an exemplary embodiment of a recorder, such as a compact disc ("CD") or DVD recorder, for recording digital information.

FIG. 3 is a high-level block diagram depicting an exemplary embodiment of a recorder 300, such as a compact disc ("CD") or DVD recorder, for recording digital information. Digital information 304 obtained from a source, such as broadcast, Internet download, original content CD or DVD, videotape, and the like, is provided to RU 303 for processing. Output of RU 303 is provided to transducer 301 for writing to media 302. In another embodiment, transducer 301 is omitted for writing to media 302, where media is a direct storage means, such as flash memory, among other direct digital information storage means.

Figure 4:
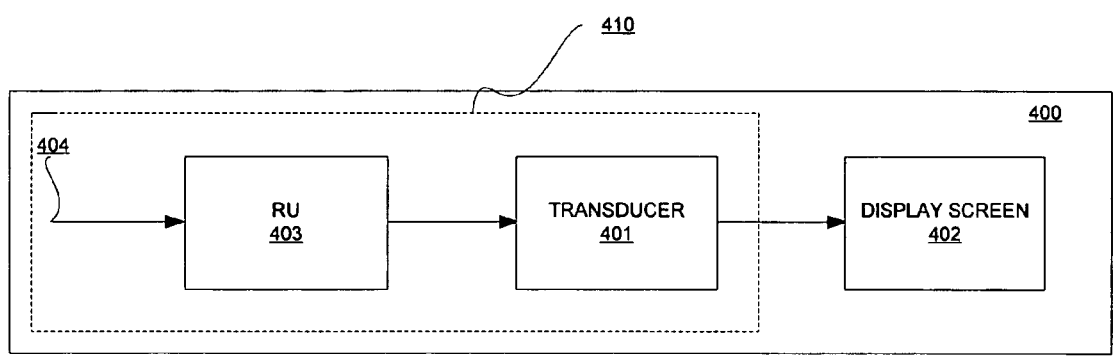
FIG. 4 is a high-level block diagram depicting an exemplary embodiment of a monitor, such as for a high-definition television ("HDTV") or a computer, for displaying digital information.

FIG. 4 is a high-level block diagram depicting an exemplary embodiment of a monitor 400, such as for a high-definition television ("HDTV") or a computer, for displaying digital information. Digital information 404 obtained from a source, such as broadcast, Internet download, original content CD or DVD, videotape, and the like, is provided to RU 403 for processing. Output of RU 403 is provided to transducer 401 for displaying on display screen 402. Notably, a projector 410 may be used with a separate surface for imaging.

Prior to a detailed description the above-mentioned RUs, a pictorial description of results from such RUs is provided for clarity.

Figure 5A:
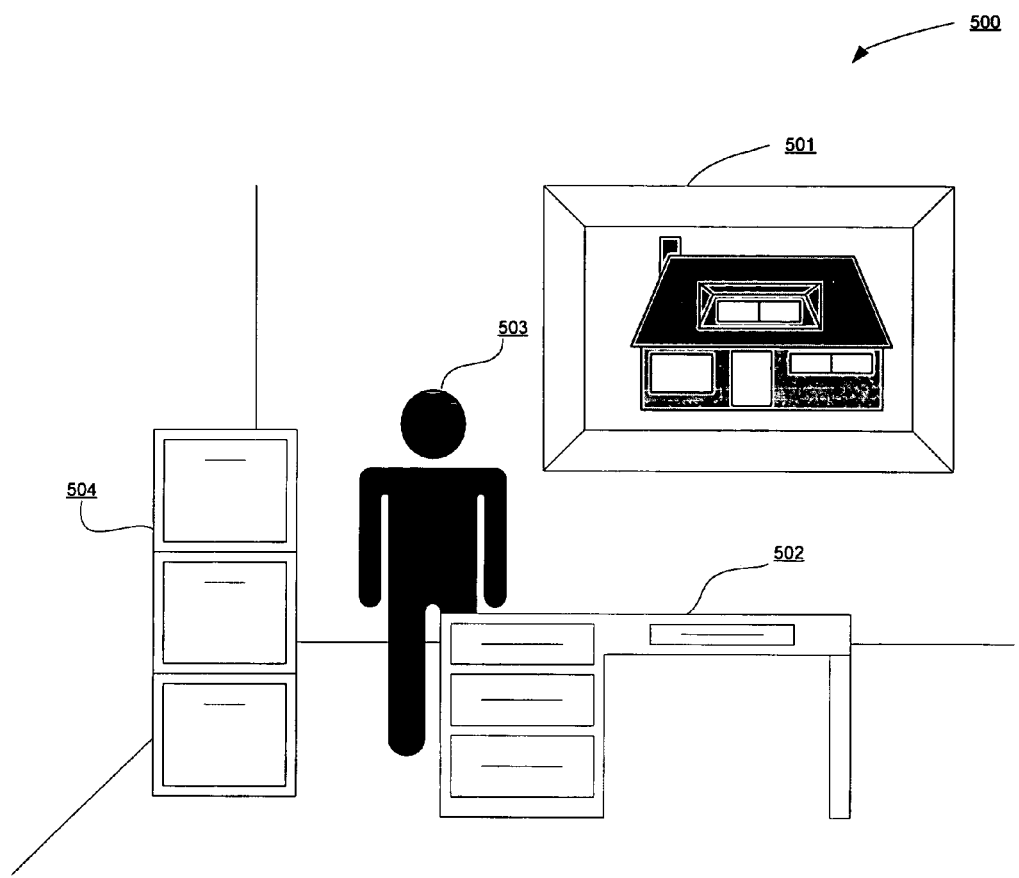
FIGS. 5A through 5E are respective pictorial diagrams of an image for a sequence of frames.
Figure 5B:
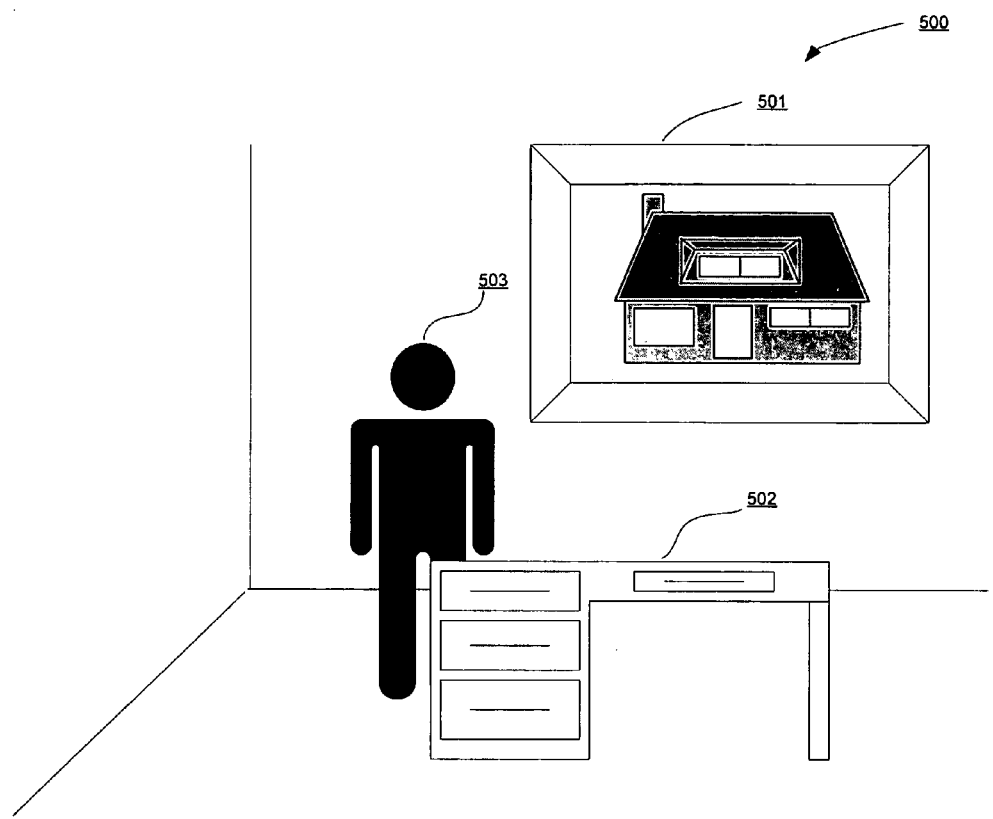
Figure 5C:
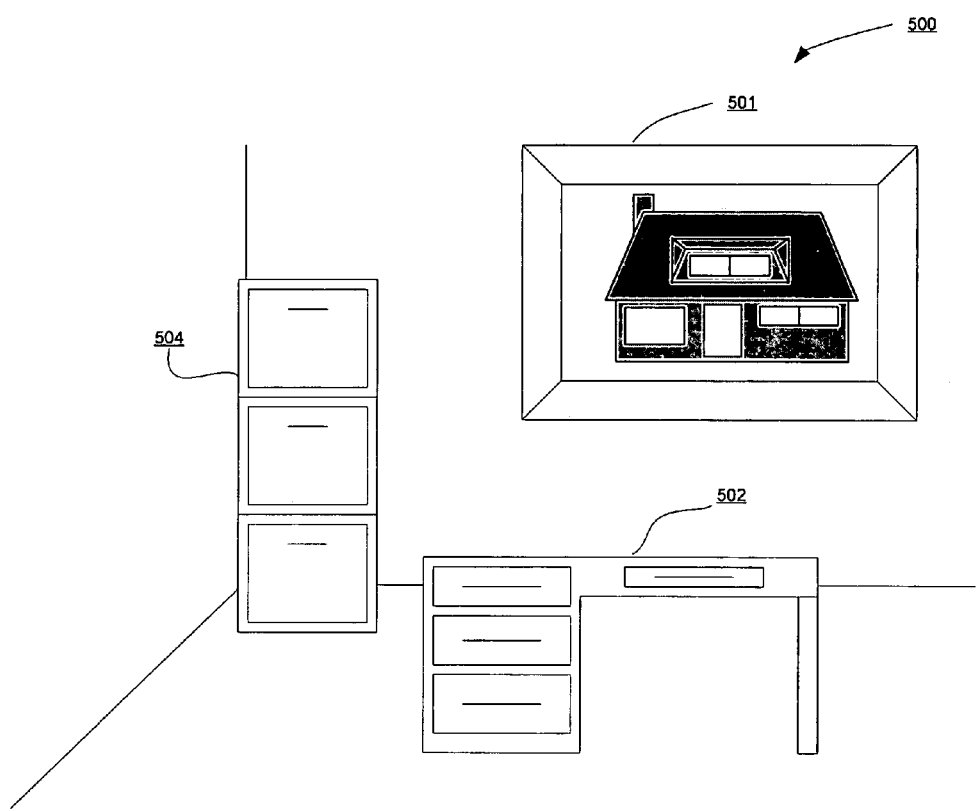
Figure 5D:
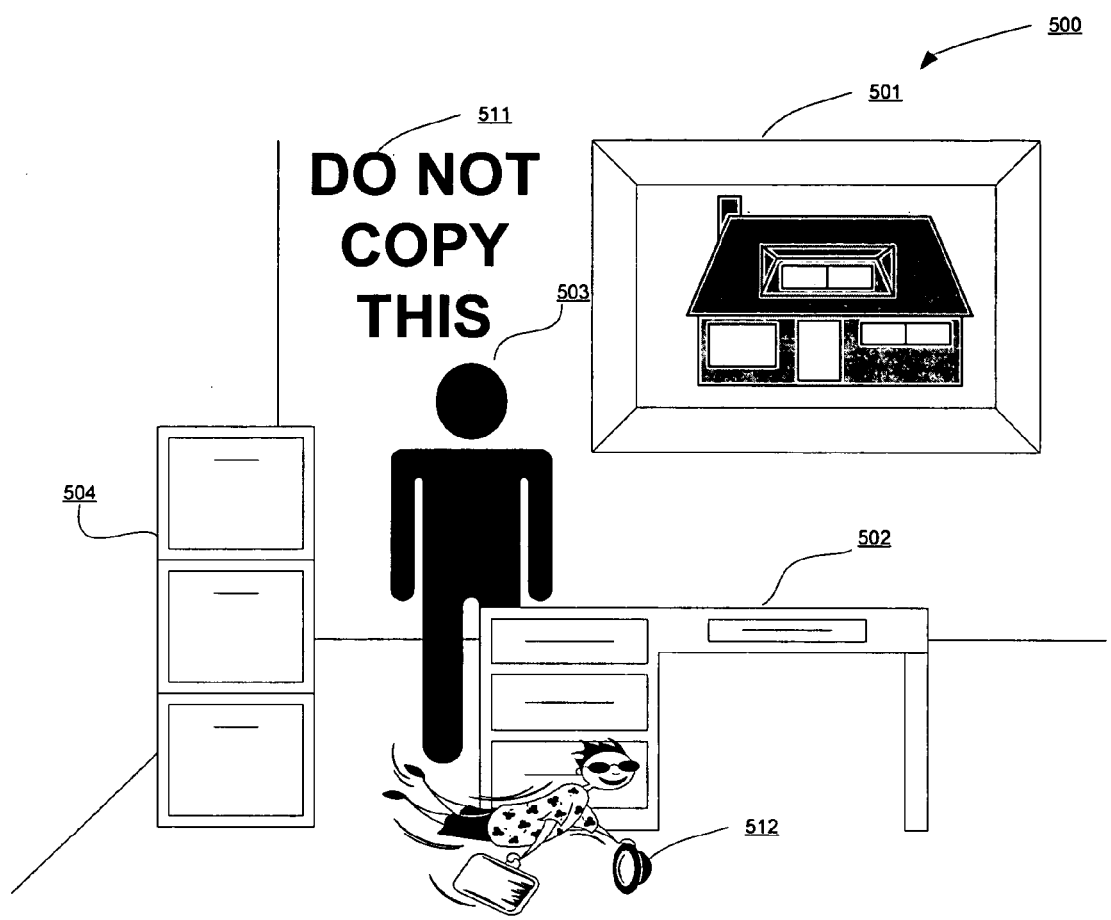
Figure 5E:
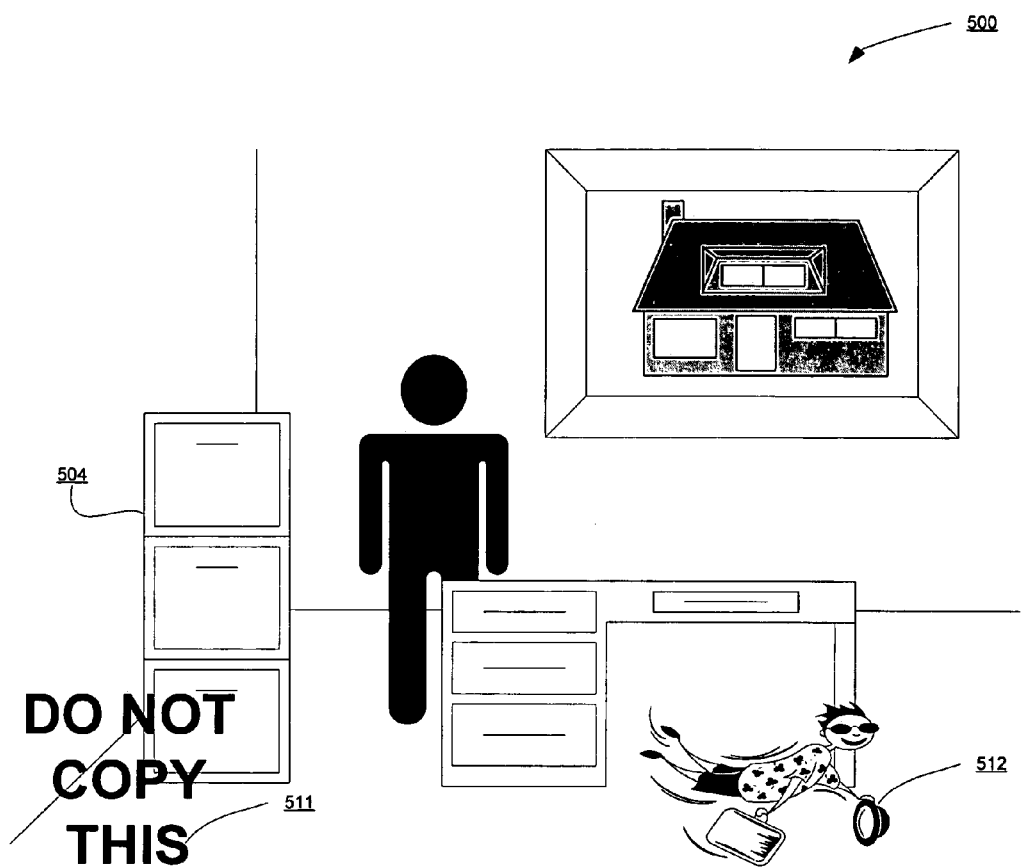

FIGS. 5A through 5E are respective pictorial diagrams of an image 500 for a sequence of frames. In its unadulterated state in FIG. 5A, image 500 for a frame in a sequence includes a picture 501, a desk 502, a person 503 and a filing cabinet 504. However, in a next or subsequent frame in the sequence of frames, a part of the scene, such as filing cabinet 504, may be removed, as shown in FIG. 5B. In a next or subsequent frame in the sequence of frames, a part of the scene, such as filing cabinet 504, may be moved and a character, such as person 503, may be removed, as shown in FIG. 5C. Additionally or alternatively, an addition of an object, such as a text message or a character, may be added to a scene. For example, as shown in FIG. 5D, a text message 511 and a character 512 have been added to image 500. Furthermore, inserted objects may be may be inserted at different locations from frame-to-frame, as shown in FIG. 5E with respect to text message 511 and character 512.

Thus, it should be appreciated that image processing may include adulteration of source material by one or more of the following: insertion of one or more objects that are not part of the source material, movement of one or more inserted objects that are not part of the source material, movement of one or more objects that are part of the source material, removal ("cloaking") of one or more objects of the source material. Additionally, a RU, responsive to detected watermarking of source material or requesting of key for the source material, may invoke adulteration unless a proper response is provided. It should be appreciated that prior attempts at cloaking video have involved prerecorded changes. Prerecorded changes are more easily defeated than real-time randomly imposed changes to source material.

Figure 6:
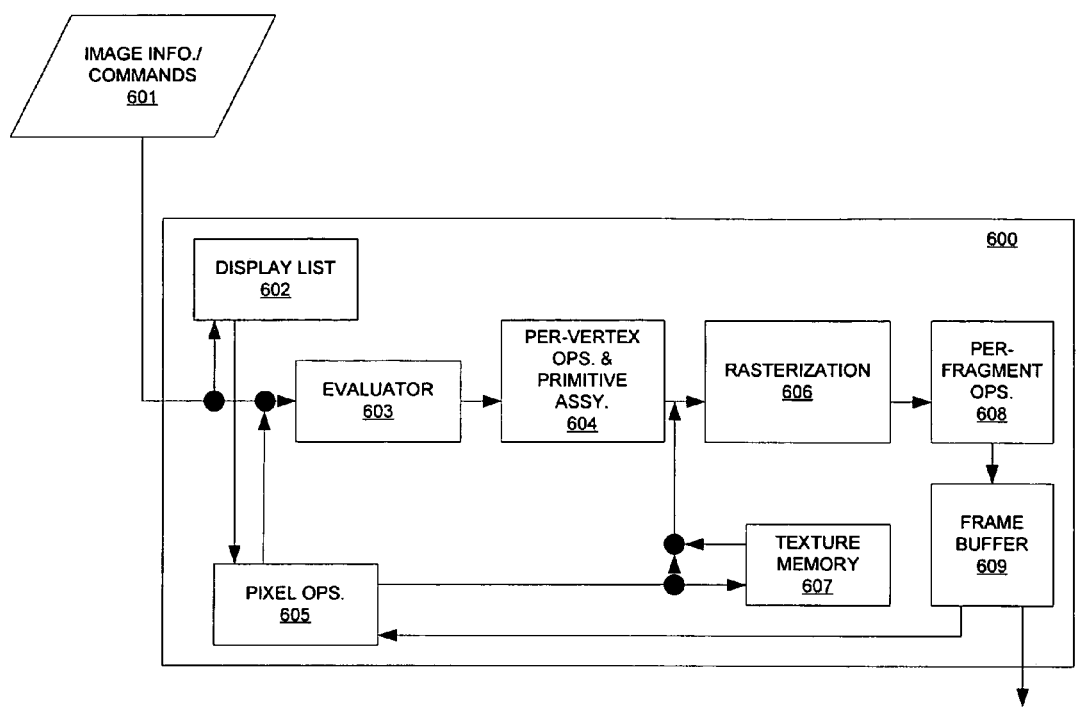
FIG. 6 is a high-level block diagram depicting an exemplary embodiment of a graphics pipeline.

FIG. 6 is a high-level block diagram depicting an exemplary embodiment of a graphics pipeline 600. Graphics pipeline 600 is shown as an OpenGL pipeline for purposes of clarity by example; however, any of a variety of known pipeline architectures may be used. Graphics pipeline 600 may be in any of the above-mentioned RUs 103, 203, 303, and 403. Image information or content, and commands, 601 are provided to Graphics pipeline 600 with frame dividers and with tags for video cloaking. Graphics pipeline 600 includes display list stage 602, evaluator stage 603, per-vertex operations and primitive assembly stage 604, pixel operations stage 605, rasterization stage 606, texture memory stage 607, per-fragment operations stage 608, and frame buffer stage 609.

Figure 7:
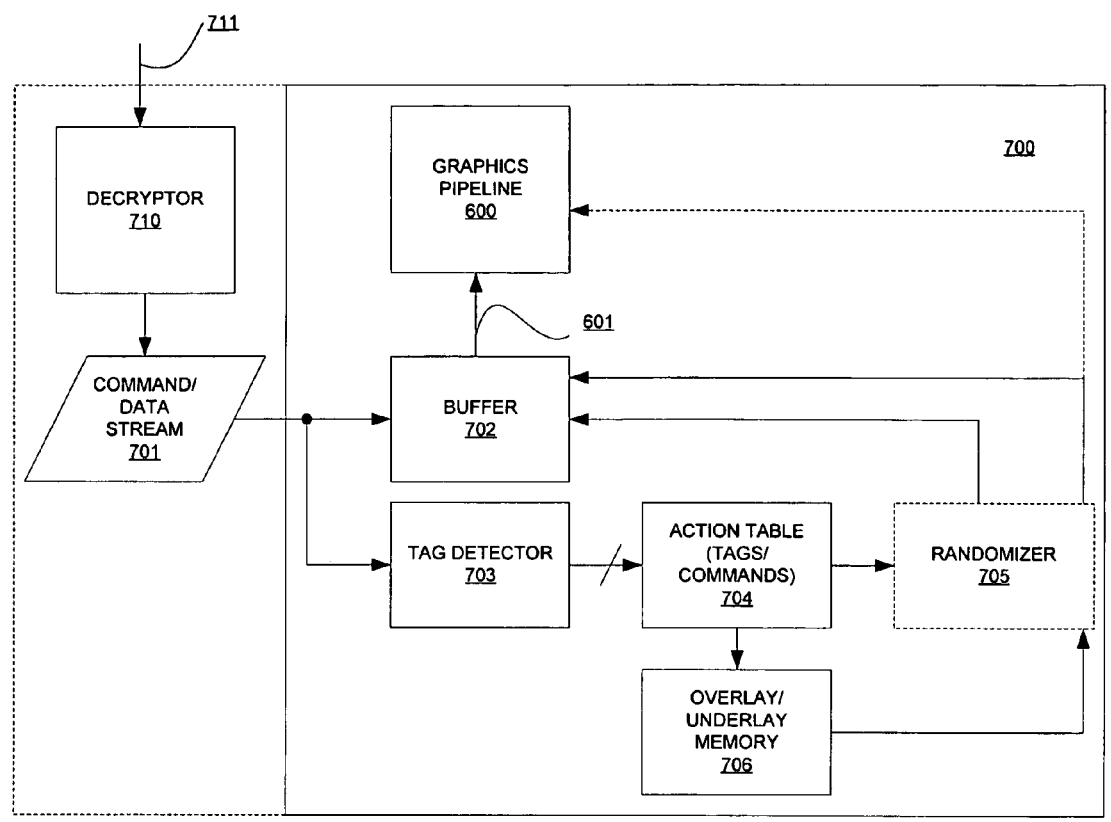
FIG. 7 is a block diagram depicting an exemplary embodiment of an image content distortion system.

FIG. 7 is a block diagram depicting an exemplary embodiment of an image content distortion system 700. Notably, video protection system may be partially or completely internal within a RU. Optionally, a decryptor 710 is included with image content distortion system for decrypting a received encrypted command and data stream 711 and providing a decrypted command and data stream 701. A pop-up graphical user interface ("GUI") may be displayed by a RU responsive to detecting encrypted content, where the GUI has a data entry block for entry of a key by a user. Command and data stream 701 is provided to buffer 702 and to tag detector 703. Tags in command and data stream 701 are detected by tag detector 703, and detected tags are provided to action table 704.

Action table 704 may be a lookup table with tags and associated commands. Thus, a detected tag may be used to find an associated command in action table 704. Tags and associated commands may be predefined as part of video protection system 700, or, alternatively or in combination, tags and associated commands may be selected and programmed into action table 704.

Figure 12B:
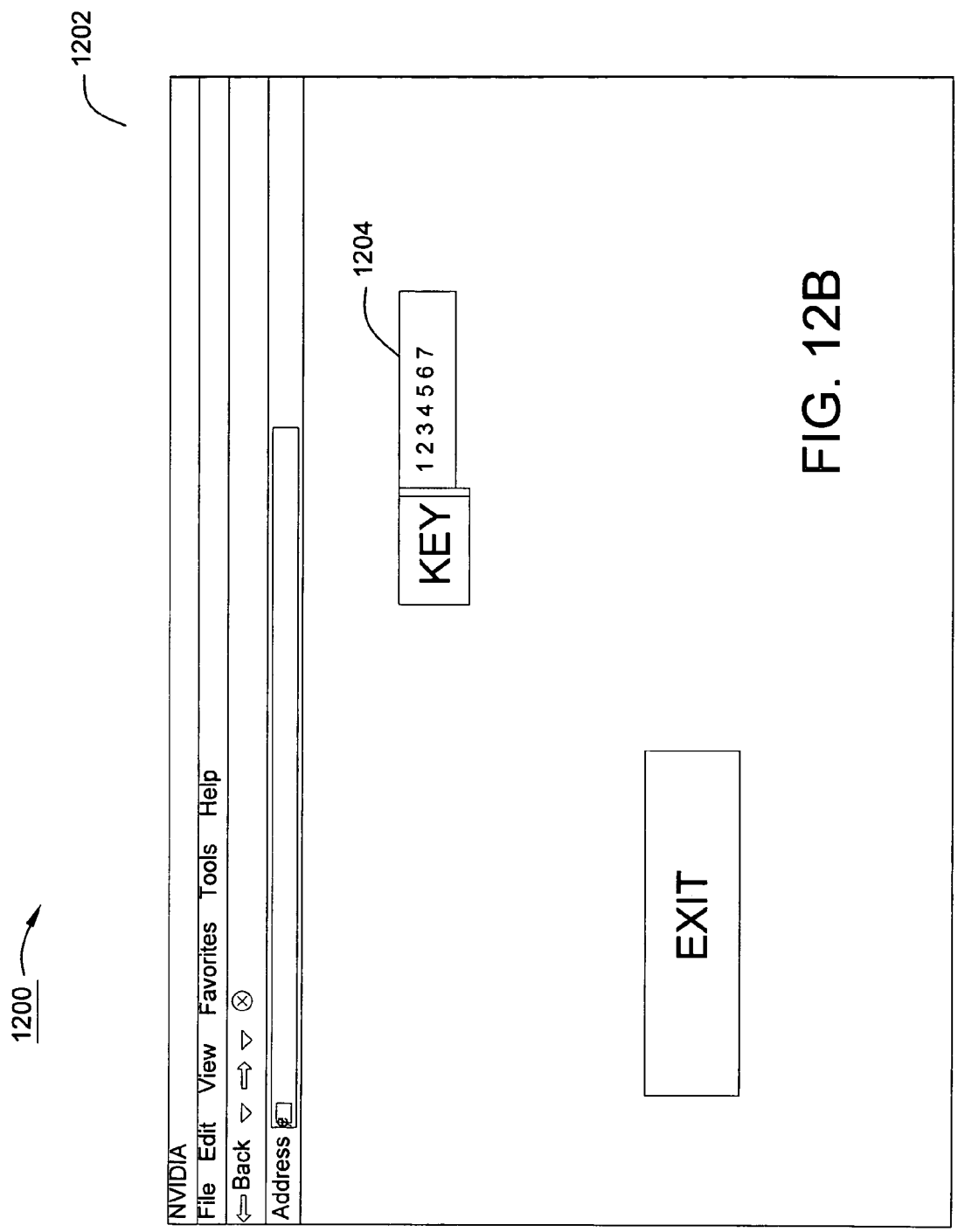
FIG. 12B illustrates a graphical user interface for entry of key information.

A found command ("tagged command") in action table 704 may then optionally be provided to a randomizer, to randomly apply ignore or send a received tagged command to buffer 702. A randomizer may be used for difficulty in filtering out video display results associated with tagged commands, as well as for reducing possibility of negatively impacting viewing of video display results. Randomizer 705 may include a random number generator. Alternatively, randomizer 705 may include a counter, for example to count each watermark tag, or command therefor, and to insert watermarks after each count of some number of such watermark tags or to alter the image content responsive to watermark count. Furthermore, in response to detection of one or some number of watermark tags, a GUI may be invoked for a user to enter a key. For example, FIG. 12B illustrates a graphical user interface having key information. Responsive to entry of an acceptable key being entered, a user may be provided access to a highest quality of resolution allowed or some down sampled version thereof. Alternatively, responsive to an acceptable key not being entered a low quality image may be displayed. In another embodiment, an acceptable key may be used to toggle video cloaking off, or to toggle recording on.

Buffer 702 stores data and associated command information, and thus tagged commands may be stored back in the same association in which the tags for the tagged commands were received.

Tagged commands associated with texture may include blending commands for cloaking image content or blocking commands for inserting image content, such as an image overlay or underlay. Thus, for example, both blending and blocking may be used simultaneously with respect to the same frame of image content.

Tagged commands for blocking may obtain predefined textures from a separate over/underlay memory 706, which in response may provide a selected overlay/underlay to buffer 702 for temporary storage, or optionally directly to graphics pipeline 600, such as for texture memory 607 of FIG. 6. Notably, this technology may be used in two-dimensional rendering, as well as three-dimensional rendering. For three-dimensional rending, display lists may be used for processing image content with tagged commands.

Accordingly, it should be understood that image content may be inserted, deleted and modified. Furthermore, it is not necessary that insertions be added into image content, but may be inserted into a vertical blanking interval.

Cloaking is done using tags inserted into a command/data stream. Each tag indicates a starting and ending location. For example, a starting and ending vertex may be identified. Also, by way of example, a starting and ending texel may be identified. It is not necessary to explicitly identify an ending location. For example, a starting vertex of a tri-strip may be identified, and a set number of triangles may be set for cloaking starting from that starting vertex.

Furthermore, this technology may be used for affecting visual content to display image content with different ratings. For example, an R rated movie due to nudity, may be displayed as a PG movie without nudity by adding cloaking responsive to tagging the image content. This type of cloaking may involve adding image content for blocking nudity, or may involve distorting image content, such as use of a magnified portion of the image to blur a pixel ("pixelation").

Additionally, tags may be used to set the refresh rate. By varying the refresh rate, unauthorized copiers would get a distorted copy.

Notably, tags do not need to be explicitly identified. Tags may be particular vertices or a combination of multiple vertices. For example, if two, or some other number greater than two, vertices in a row have a particular dot product value, that value may be used as a tag. There may be one or more values that are used as tags. Accordingly, a tag detector for this example would take dot products and compare them bitwise to one or more dot product tags. Additionally, a particular geometry may be tagged, such as a body part of a character, for cloaking, and such geometry could be cloaked responsive. Furthermore, it may be one polygon that is used to provide a tag. Moreover, it may be a plurality of vertices of a plurality of associated polygons not necessarily connected to one another that are used to provide a tag.

Furthermore, for three dimensional renderings, each display list may be identified for cloaking or no cloaking of image content. Thus, a tag may be used to indicate which display lists will be cloaked.

Furthermore, it should be appreciated that image content is includes video or graphically generated content, and is not limited to movies or other forms of moving pictures, but may include computer aided design content. Additionally, such content may be displayed without significantly impacting the viewing experience, while significantly impacting the viewing experience of unauthorized copies.

Figure 7A:
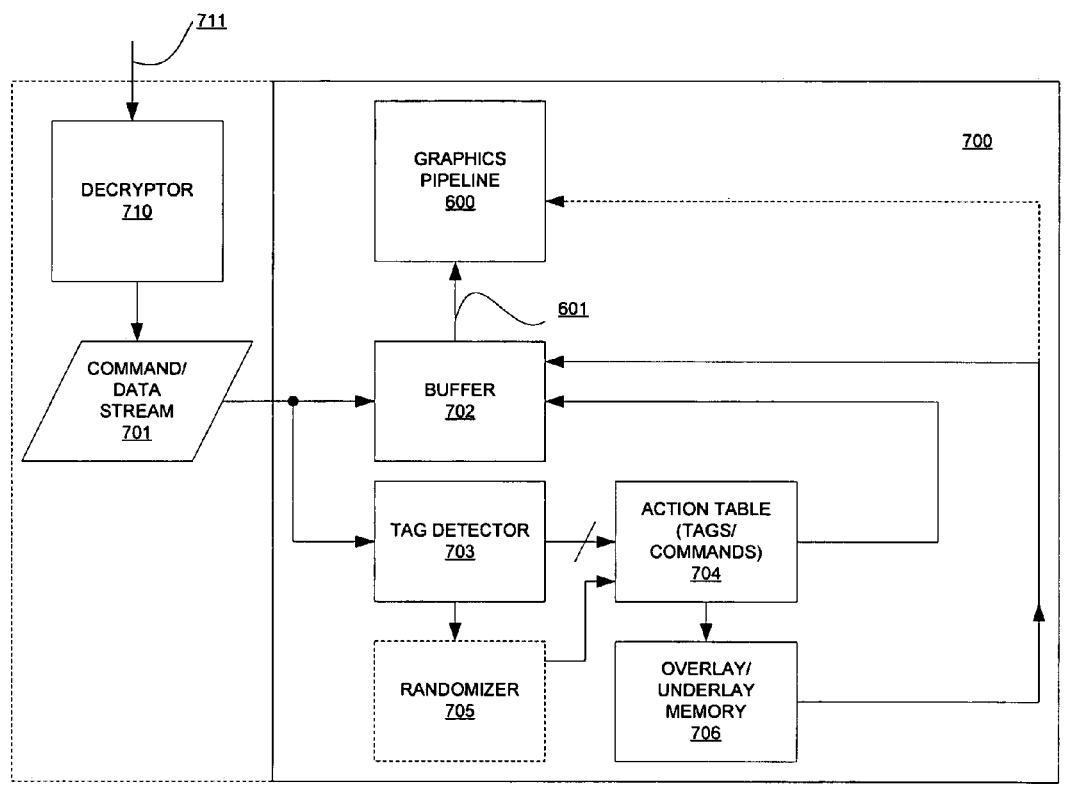
FIG. 7A is a block diagram depicting an exemplary embodiment of an alternate embodiment of an image content distortion system.

FIG. 7A is a block diagram depicting an exemplary embodiment of an alternate embodiment of an image content distortion system 700. In this embodiment, randomizer 705 is coupled to tag detector 703 to obtain an indication of when tags are detected. Responsive to detecting a tag, randomizer 705 randomly activates action table 704 to carry out a command associated with a detected tag.

Figure 8:
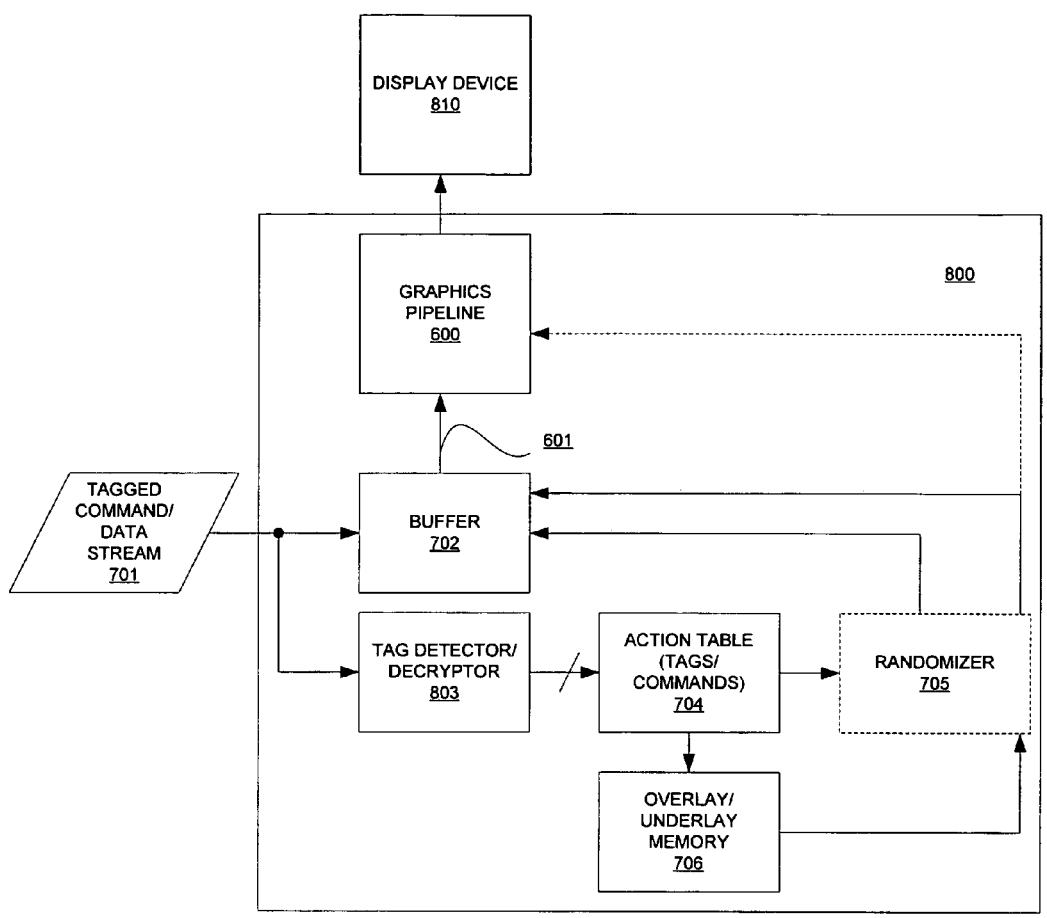
FIG. 8 is a block diagram depicting an exemplary embodiment of an image content protection system.

FIG. 8 is a block diagram depicting an exemplary embodiment of an image content protection system 800. Image content protection system 800 is similar to image distortion system 700 of FIG. 7, except that tag detector 703 is replaced with tag detector/decryptor 803. For systems where command and data stream 701 is not encrypted over a bus prior to being received by a RU, detector/decryptor 803 detects and decrypts tags. A decrypted tag may be used as described above.

Another use for tags is to provide for one of a plurality of levels of image resolution. Thus, fully authorized use, would be a highest available resolution, where a less than fully authorized use would be for a down-sampled version of the highest available resolution for display device 810 coupled to image content protection system. Furthermore, unauthorized use, such as no encrypted tag to decrypt, may distort the viewing experience. For example, each frame location may be moved unless proper authorization is received.

Furthermore, content received having a watermark may be detected based on the watermark. Watermarked content may be down-sampled unless an authorization code is provided.

Accordingly, it should be appreciated that image data may be added, removed or modified to provide cloaked image content. One or more tags may be used on each frame to clock image data. To avoid significantly impacting authorized viewing experience, cloaked image content is done on only on selected objects of selected frames, which selection may be randomly imposed.

Additionally; forms of cloaking may be content provider specific. Action table 704 may further be indexed to content providers, such that a subset of all available cloaking applications is used.

Figure 9A:
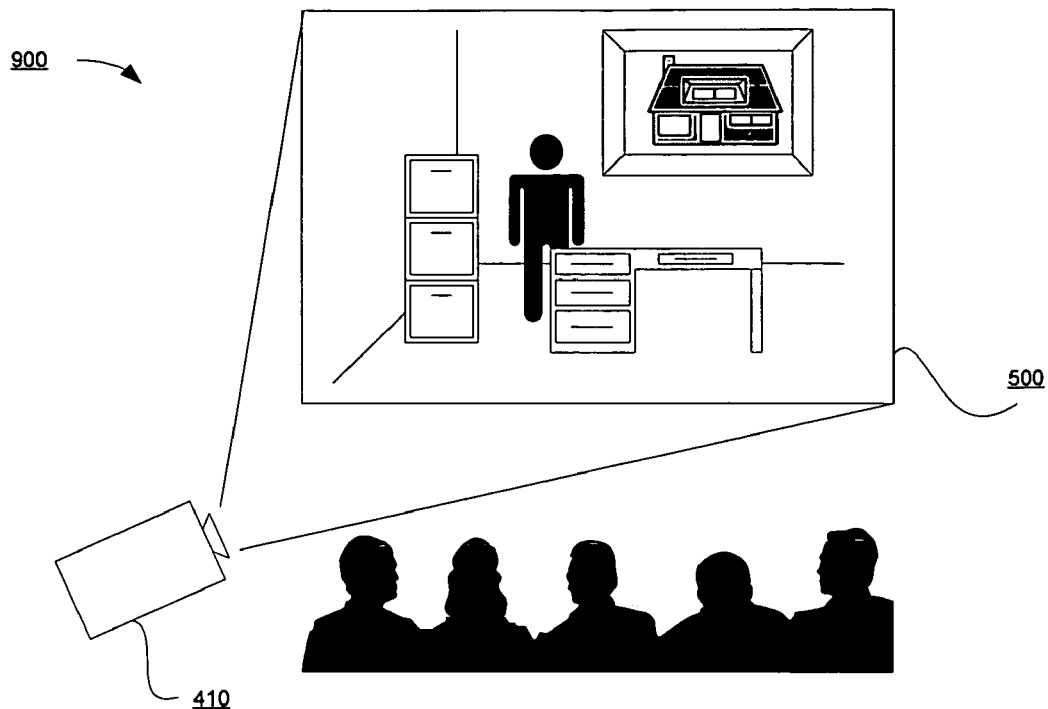
FIGS. 9A and 9B are pictorial diagrams of an example of a display environment.
Figure 9B:
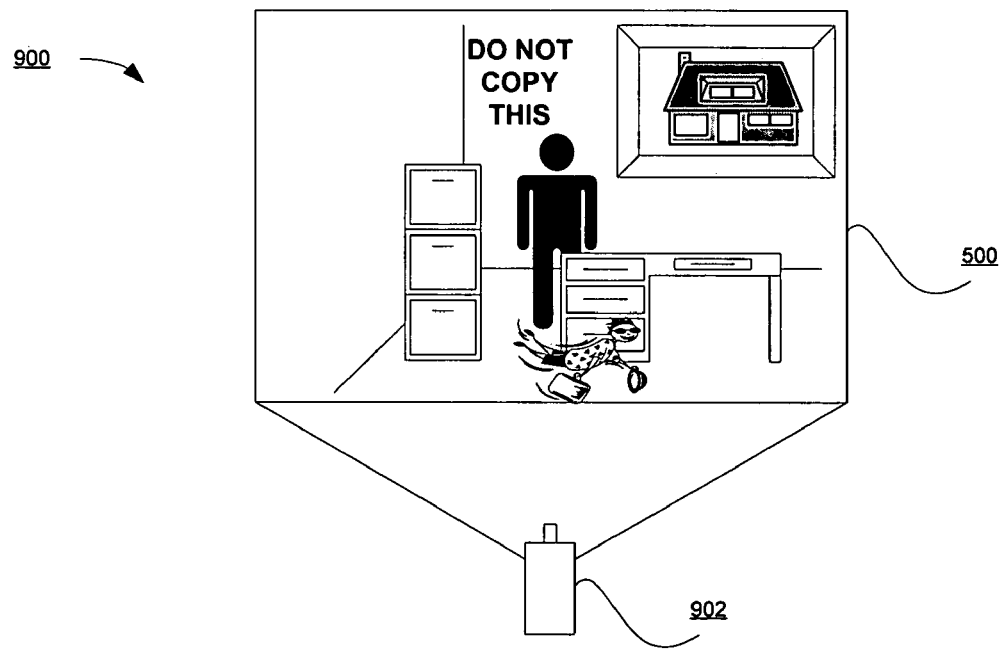

FIGS. 9A and 9B are pictorial diagrams of an example of a display environment 900. Image 500 is displayed by projector 410, and appears to viewers as shown in FIG. 9A. However, because projector 410 is as described above, image 500 as it appears to camera 902 is recorded with overlays 511 and 512 (labeled in FIG. 5D) as shown in FIG. 9B. If three-dimensional processing is used to provide image 500, items may be removed as described above.

Figure 10A:
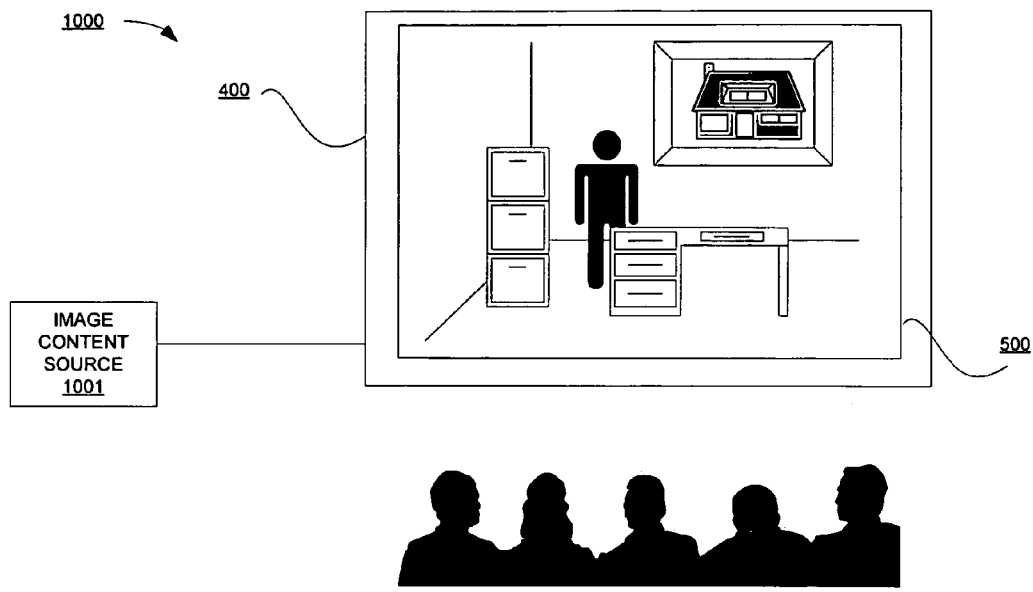
FIGS. 10A and 10B are pictorial diagrams of an example of another display environment.
Figure 10B:
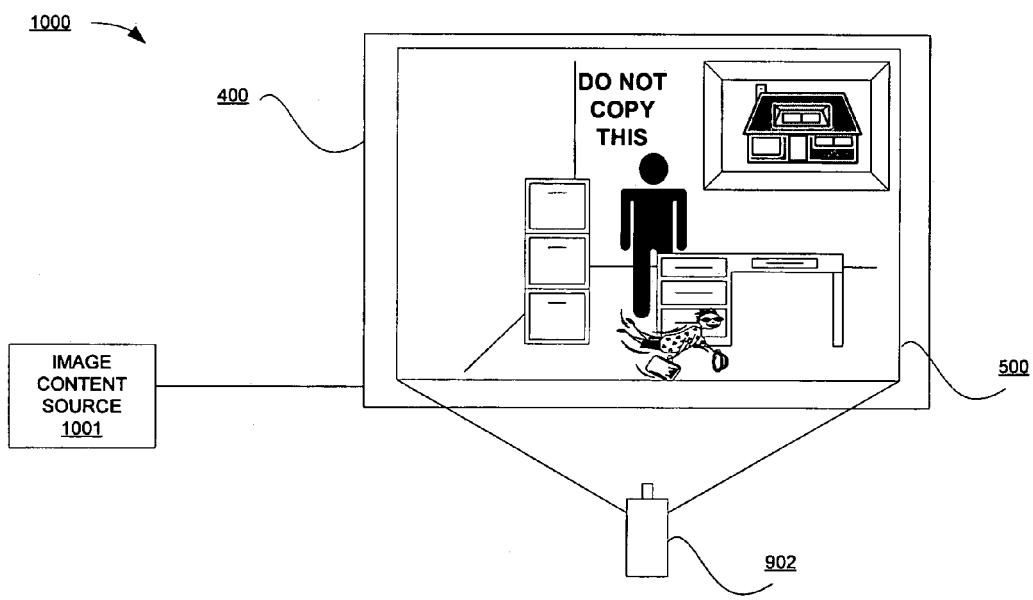

FIGS. 10A and 10B are pictorial diagrams of an example of a display environment 1000. Image 500 is provided from image content source 1001. If image content source 1001 includes tags as described above, monitor 400 will produce a protected content version responsive to such tags. For example, image 500 appears to viewers as shown in FIG. 10A. However, because monitor 400 is as described above, image 500 as it appears to camera 902 is recorded with overlays 511 and 512 (labeled in FIG. 5D) as shown in FIG. 10B. If three-dimensional processing is used to provide image 500, items may be removed, added or modified as described above.

Figure 11A:
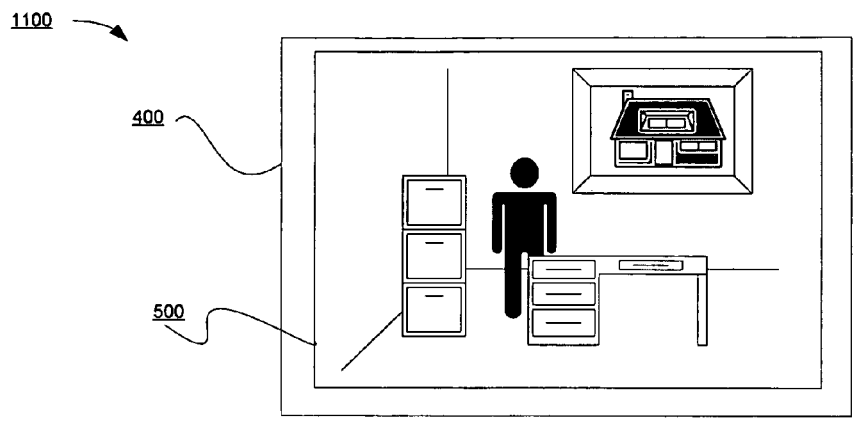
FIGS. 11A and 11B are pictorial diagrams of an example of a record environment.
Figure 11A:
Figure 11B:
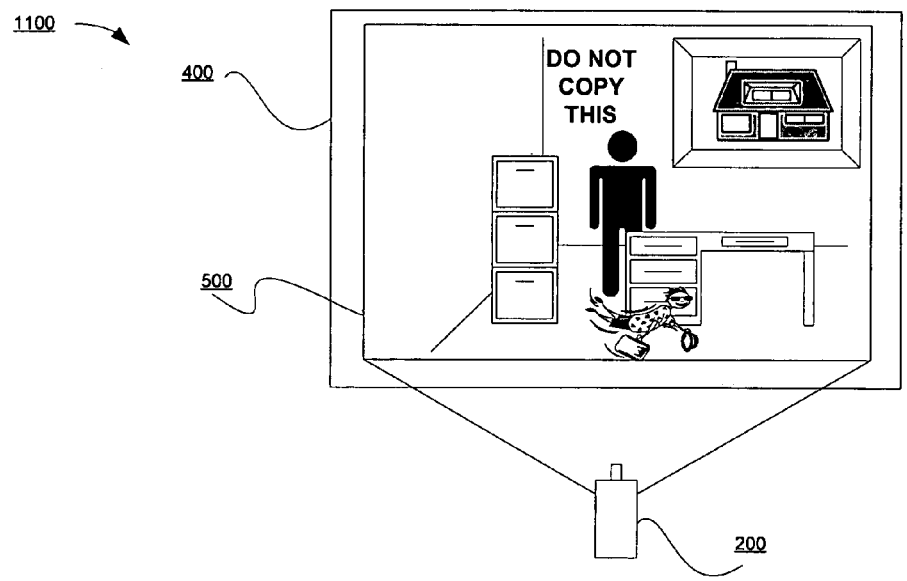

FIGS. 11A and 11B are pictorial diagrams of an example of a record environment 1200. Image 500 is provided from an image content source to a monitor 1201. Image 500 appears to viewers as shown in FIG. 11A. However, because recorder 300 is as described above, image 500 as recorded by recorder 300 for playback is recorded with overlays 511 and 512

(labeled in FIG. 5D) as shown in FIG. 11B. If three-dimensional processing is used to provide image 500, items may be removed, added or modified as described above.

Some embodiments of the present invention make use of key information to enable specific features. FIG. 12B illustrates a computer display 1200 having a graphical user interface 1202 that includes a data entry box 1204. In operation, a user will enter a key in the data box 1204 and then cause that key information to be input to an underlying software routine. Such manual entry of information is well-known and is widely supported in software development programs. Once the key is obtained by software, that software compares the key information with a key data list. If the entered key is deemed acceptable, that is, the entered key is on the key data list, the locked-out features are made available to the operator.

While the foregoing describes exemplary embodiment(s) in accordance with one or more aspects of the invention, other and further embodiment(s) in accordance with the one or more aspects of the invention may be devised without departing from the scope thereof, which is determined by the claim(s) that follow and equivalents thereof. Claim(s) listing steps do not imply any order of the steps. Trademarks are the property of their respective owners.

The invention claimed is:

1. A method for altering source digital image content, comprising:
   providing source digital image content organized as a sequence of frames to a rendering unit, wherein rendering of the source digital image content produces a first sequence of rendered frames for real-time display;
   altering the source digital image content within the rendering unit in response to tags in a data stream that provide tagged commands to the rendering unit to remove, add, or modify an item in the source digital image content using three-dimensional processing to produce a second sequence of rendered frames that is different than the first sequence of rendered frames, wherein the item is within a portion of the first sequence of rendered frames that is visible to a viewer,
   the step of altering the source digital image content further including detecting one of the tags in the data stream associated with a frame in the sequence of frames, a portion of the frame being altered to generate an altered frame in the second sequence of rendered frames; and
   utilizing the tag to access an action table and find the tagged commands, to cause the first sequence of rendered frames to be displayed and the second sequence of rendered frames to be recorded.

2. The method, according to claim 1, wherein the step of altering comprises randomly selecting frames for alteration.

3. The method, according to claim 1, wherein altering comprises distorting at least one object visible to the viewer in a frame.

4. The method, according to claim 1, wherein altering comprises relocating at least one object visible to the viewer in a frame.

5. The method, according to claim 1, wherein altering comprises adding at least one object visible to the viewer to a frame.

6. The method, according to claim 5, wherein the rendering unit is a graphics processing unit.

7. The method of claim 1 wherein the rendering unit causes display of the altered frame upon detection of the tag unless a proper response is entered by the user.

8. The method of claim 7 including the step of applying the tag to a randomizer to randomly apply or ignore the tag or send the tag to the action table.

9. The method of claim 1 including the step of, in response to the detection of the tag, invoking a graphical user interface (GUI) to allow a user to enter a key to prevent the action table from being accessed so that the unaltered frames are not displayed.

10. The method of claim 1, wherein the tagged commands are associated with texture and include blending commands for altering the source digital image content.

11. The method of claim 1, wherein the tag is determined as a dot product of multiple vertices in a row.

12. A device for altering source digital image content, comprising:
   a rendering unit configured to:
      produce a first sequence of rendered frames for real-time display by rendering the source digital content that is organized as a sequence of frames,
      detect tags in a data stream, and
      associate the detected tags with tagged commands for altering the source digital image content to remove, add, or modify an item in the source digital image content using three-dimensional processing to produce a second sequence of rendered frames that is different than the first sequence of rendered frames, wherein the item is within a portion of the first sequence of rendered frames that is visible to a viewer and the rendering unit includes a tag detector for detecting the tags in the data stream, one of the tags being associated with one frame in the sequence of frames, a portion of the one frame being altered to generate an altered frame in the second sequence of rendered frames; and
   an action table that is accessed utilized to find the tagged commands and cause the first sequence of rendered frames to be displayed and the second set of rendered frames to be recorded.

13. The device, according to claim 12, wherein the rendering unit comprises memory for storing overlays for alteration of the image content.

14. The device, according to claim 12, wherein the rendering unit comprises a random number generator for randomly selecting when to apply the commands.

15. The device, according to claim 14, wherein the random number generator randomly selects when to apply overlays.

16. The device, according to claim 14, wherein the rendering unit comprises a decryptor.

17. The device, according to claim 14, wherein the rendering unit is configured to detect watermarks and to alter image frames in response to detected watermarks.

18. The device, according to claim 14, wherein the rendering unit detects watermarks and provides a graphical user interface in response to at least one detected watermark.

19. The device, according to claim 18, wherein the graphical user interface is provide after detecting a threshold number of watermarks.

20. The device, according to claim 19, wherein the graphical user interface provides a data entry block for entry of a key.

21. The device, according to claim 20, wherein the rendering unit is configured to down sample in response to a failure to enter an acceptable key.

22. The device, according to claim 20, wherein the rendering unit is configured to disable recording in response to a failure to enter an acceptable key.

23. The device, according to claim 20, wherein the rendering unit is configured to randomly alter the selected frames in response to a failure to enter an acceptable key.

24. The device, according to claim 14, wherein the device is a digital video camera.

25. The device, according to claim 14, wherein the device is a digital video disc recorder.

26. The device, according to claim 14, wherein the device is a compact disc recorder.

27. The recording device, according to claim 14, wherein the device is a hard disk drive recorder.

28. The device, according to claim 14, wherein the device is a digital tape drive recorder.

29. The device, according to claim 14, wherein the device is a floppy disk drive recorder.

30. The device, according to claim 12, wherein the tagged commands are associated with texture and include blending commands for altering the source digital image content.

31. The device, according to claim 12, wherein the tag is determined as a dot product of multiple vertices in a row.

* * * * *